United States Patent [19]

Ijiri et al.

[11] Patent Number: 4,784,235
[45] Date of Patent: * Nov. 15, 1988

[54] OIL PRESSURE REACTION CONTROL VALVE FOR POWER STEERING APPARATUS

[75] Inventors: Waichiro Ijiri; Shuzo Hirakushi, both of Kashihara, Japan

[73] Assignee: Koyo Seiko Kabushiki Kaisha, Osaka, Japan

[*] Notice: The portion of the term of this patent subsequent to Jan. 20, 2004 has been disclaimed.

[21] Appl. No.: 879,117
[22] PCT Filed: Oct. 11, 1985
[86] PCT No.: PCT/JP85/00563
§ 371 Date: Jun. 13, 1986
§ 102(e) Date: Jun. 13, 1986
[87] PCT Pub. No.: WO86/02325
PCT Pub. Date: Apr. 24, 1986

[30] Foreign Application Priority Data

Oct. 11, 1984 [JP] Japan ............................... 59-213711

[51] Int. Cl.4 .............................................. B62D 5/06
[52] U.S. Cl. ..................................... 180/142; 91/434; 180/143
[58] Field of Search ............... 180/141, 142, 143, 148; 91/434, 458; 137/625.48

[56] References Cited

U.S. PATENT DOCUMENTS

| 3,672,137 | 9/1972 | Inoue | 180/142 |
| 3,744,515 | 7/1973 | Inoue | 180/143 X |
| 4,434,866 | 3/1984 | Duffy | 180/143 |
| 4,531,602 | 7/1985 | Roehringer | 180/143 |
| 4,637,484 | 1/1987 | Ijiri et al. | 180/142 |

FOREIGN PATENT DOCUMENTS 2329328  1/1975  Fed. Rep. of Germany ...... 180/143

Primary Examiner—John J. Love
Assistant Examiner—Charles R. Watts
Attorney, Agent, or Firm—Bruce L. Adams; Van C. Wilks

[57] ABSTRACT

A steering force control apparatus for a power steering apparatus of a vehicle of the type having a reaction chamber responsive to fluid pressure applied thereto for producing a reaction force to counteract the steering force produced by a power cylinder. A main tubular spool is disposed in a valve case movably relative to the valve case and has an inner valve surface. A sub-spool is disposed in the main spool movably relative to the main spool and has an outer valve surface cooperative with the inner valve surface to define a variable throttle for selectively connecting a fluid pump to the reaction chamber and to the power cylinder according to the movement of the sub-spool relative to the main spool in response to the vehicle speed. The main spool is moved relative to the valve case and the sub-spool in response to the fluid pressure applied to the reaction chamber when the fluid pressure is above a certain value to enable the variable throttle to disconnect the fluid pump from the reaction chamber. A fixed throttle is formed in the sub-spool for connecting the reaction chamber to a fluid tank to release the fluid pressure in the reaction chamber.

11 Claims, 4 Drawing Sheets

OIL PRESSURE REACTION CONTROL VALVE FOR POWER STEERING APPARATUS

FIELD OF THE INVENTION

The invention relates to a power steering apparatus for an automobile, and more particularly, to a control valve of a steering oil pressure which is supplied to a reaction chamber of a main control valve of a power steering apparatus.

DESCRIPTION OF THE PRIOR ART

In a power steering apparatus, a control oil pressure is supplied to a power cylinder from a pump through a main control valve while a steering oil pressure is derived by a branch from the pump output. There is provided an auxiliary control valve which controls the steering oil pressure in accordance with a control signal which is formed on the basis of an output from a vehicle speed sensor, and the steering oil pressure which is regulated by the auxiliary control valve is introduced into the reaction chamber within the main control valve, thereby producing a steering force which depends on the vehicle speed.

A typical example of a control valve which controls a steering oil pressure supplied to a reaction chamber is disclosed in U.S. Pat. No. 3,744,515 issued July 10, 1973. In this control valve, a steering oil pressure developed by the pump is passed initially through a variable throttle and then through a fixed throttle, with the variable throttle being adjusted in accordance with a vehicle speed. The variable throttle comprises a main cylindrical spool slidably disposed in a valve casing with its opposite ends being supported by springs, and a sub-spool which is slidably fitted into the main spool with its opposite ends similarly supported by springs so that a relative displacement between the main spool and the sub-spool changes the area of an opening. The main spool is actuated by the output oil pressure from the pump and the pressure in the reaction chamber of the main control valve while a control signal which varies with the vehicle speed is applied to the sub-spool. A control valve of the type described has a disadvantage that the rigidity of a steering wheel cannot be improved during the time an automotibe is running straightforward at a high speed, since the reaction pressure cannot be increased in a region adjacent to the neutral where the variable throttle has the greatest opening area. Another disadvantage relates to a slight increase in the reaction pressure in response to an increase in the steering oil pressure during the time the vehicle stands still, thereby precluding an easy operation of a steering wheel. In respect of the construction, each of the main spool and the sub-spool must be supported by balancing a pair of springs, but it is difficult to maintain a constant balance between the pair of springs.

SUMMARY OF THE INVENTION

The invention has for its object the provision of a compact and inexpensive oil pressure reaction control device for a power steering apparatus which assures a safety running by increasing the rigidity of a steering wheel when the vehicle is running straightforward at a high speed, by supplying an oil pressure of a stable response into a reaction chamber in response to a vehicle speed and other control signals and steering oil pressure while allowing an easy operation of a steering wheel when the vehicle stands still.

The invention is characterized by slidably disposing a sleeve-like main spool, as urged by a spring from one side, within a valve casing which is formed with a flow inlet connected to an oil pump, a return flow outlet, a flow outlet connected to a reaction chamber and a flow outlet connected to a main valve, and by fitting a sub-spool within the main spool so as to slide axially in accordance with a vehicle speed, thereby defining a variable throttle which changes its opening area in accordance with a relative displacement between the main spool and the sub-spool. The arrangement is such that when the vehicle is at rest or at a very slow speed, the variable throttle is opened only to communicate with the main valve and is closed relative to the reaction chamber, while at a higher speed, the sub-spool is moved in a direction to close the variable throttle relative to the main valve and to open the variable throttle relative to the reaction chamber to thereby increase a reaction pressure. When the reaction pressure reaches a given value in response to the steering pressure, the pressure oil causes a displacement of the main spool to cut off the reaction chamber, thus assuring a stabilized oil pressure response over a prolonged period and increasing the rigidity of a steering wheel when the vehicle runs straightforward at a high speed for safety running.

DESCRIPTION OF PREFERRED EMBODIMENT

Figure 1:
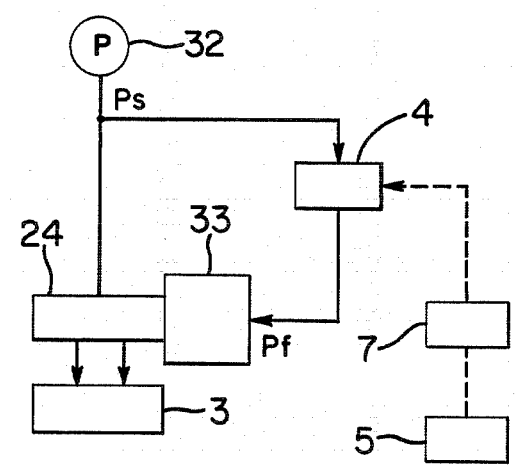
FIG. 1 is a simplified illustration of the overall power steering apparatus.

Referring to FIG. 1, a power steering apparatus comprises a channel which supplies a control oil pressure from a pump 32 through a main control valve 24 to a power cylinder 3, and a channel which supplies a steering oil pressure from the pump 32 through an auxiliary control valve 4 to a reaction chamber 33 of the main control valve 24. The auxiliary control valve 4 is actuated by a steering oil pressure Ps produced by the pump 32, as controlled by a control unit 7 on the basis of a vehicle speed sensor 5, and delivers an output oil pressure Pf to the reaction chamber 33 of the main control valve 24. The invention relates to an improvement of the auxiliary control valve 4.

FIGS. 3 to 6 show sections of the control valve according to the invention under different operating conditions. A reference character 20 represents a valve casing which is formed with a flow inlet 21 connected to an oil pump 32, a return flow outlet 22, a reaction outlet 23 connected to a reaction chamber 33 and a main flow outlet 26 connected to a main valve 24. 27 represents a sleeve-like tubular main spool which is disposed within the valve casing 20 so as to be slidable in the axial direction, and is urged rearward by a spring 28 disposed in the front inside of the valve casing 20. 29 represents a sub-spool which is fitted around a plunger 31 of a solenoid 30 which is concentrically mounted on the rear side portion of the valve casing 20. The sub-spool is slidably fitted into the main spool 27. The main spool 27 is formed with an oil opening or bore 27a communicating with the flow inlet 21, an oil opening or bore 27b communicating with the reaction flow outlet 23 and an oil opening or bore 27c communicating with the main flow outlet 26. An outer valve surface in the form of a pair of annular oil paths 29a, 29b are formed in the outer periphery of the sub-spool 29, with an annular rib 29c located between the two annular oil paths 29a, 29b. An inner valve surface in the form of two control edges 27d, 27e are formed on the inner surface of the main spool 27 on the opposite sides relative to the oil opening 27a to define a variable throttle, while a fixed throttle 29d is formed in the region of the annular oil path 29a in the sub-spool 29.

The plunger 31 which carries the sub-spool 29 extends axially a substantial length from the solenoid 30, and the sub-spool 29 is rigidly secured along the substantial length between a flange portion 45 (FIG. 6) which is formed at the base end of the plunger 31 and a nut member 42 which is mounted on the free end of the plunger 31 with a gap between the inner peripheral surface of the sub-spool 29 and the outer peripheral surface of the plunger 31. The plunger 31 is formed of a tubular member having an axial bore 41 which opens at its end to the front inside of the valve casing 20 to communicate therethrough with the return flow outlet 22. The plunger 31 is provided with an orifice 31a communicating between the gap and the axial bore 41. The flange portion 45 of the plunger 31 is formed with another orifice 31b (FIGS. 5–6) communicating between the axial bore 41 and the rear inside of the valve casing 20 separated from the front inside of the valve casing 20 by the main spool 27. A lining 51 is disposed around one end of the main spool 27, and frictionally engages with a seal 52 formed in the valve casing 20 to prevent any leakage of oil therebetween.

In assembly, the sub-spool 29 is fixed on the plunger 31 of the solenoid 30, and the main spool is fitted around the sub-spool 29. The solenoid 30, which carries the main spool 27 and the sub-spool 29 thus assembled together, the the valve casing 20 are coupled together by threads 43, and a cylindrical portion 44 of a cap member 38 is threadably engaged with the other end of the valve casing 20.

The operation will now be described. When the vehicle is at rest, a vehicle speed sensor controls the solenoid 30 to maintain the plunger 31 in the position shown in FIG. 3, with the main spool 27 being urged by the spring 28 into abutment against an end face 30a of the solenoid 30. At this time, the annular rib 29c engages with the annular rib 27d, and since the variable throttle opens the annular oil path 29b, the pressure oil from the oil pump 32 passes through the oil openings 27c to the flow outlet 26 and thus is supplied to the main valve 24. When a steering operation is then carried out, the steering pressure Ps increases, but the variable throttle is closed with respect to the reaction chamber 33. Any oil leakage through clearances or gaps between the main spool, the sub-spool and the valve casing passes through the fixed throttle 29d and axial bore 41 and returns to the return outlet 22, and hence there is no increase in the reaction pressure Pf in the reaction chamber 33. The steering torque—oil pressure characteristics, as indicated by a solid line in FIG. 2, shows a reduced steering torque.

As described, for example, in commonly owned related application Ser. No. 725,422, now U.S. Pat. No. 4,673,487, when relative displacement occurs between an input shaft and an output shaft, a reaction piston disposed within the reaction chamber 33 is urged by a projecting shaft of the input shaft. However, since the reaction chamber 33 communicates with the return flow outlet 22 through the fixed throttle 29d and the axial bore 41, any excess oil is released to the return flow outlet 22, thereby preventing a steering torque from increasing.

Figure 2:
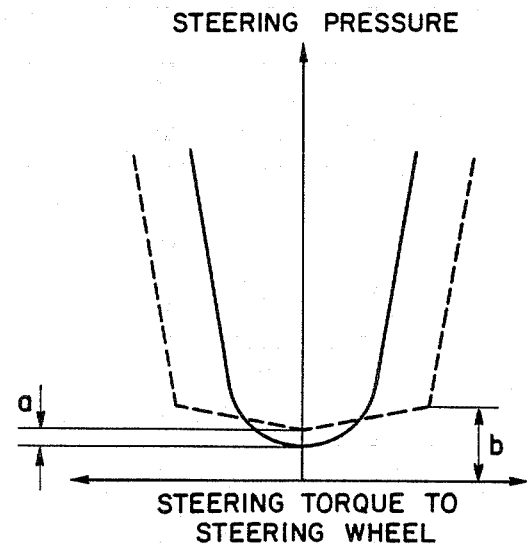
FIG. 2 graphically shows the relationship between a steering torque and a steering pressure in the control valve according to the invention.
Figure 3:
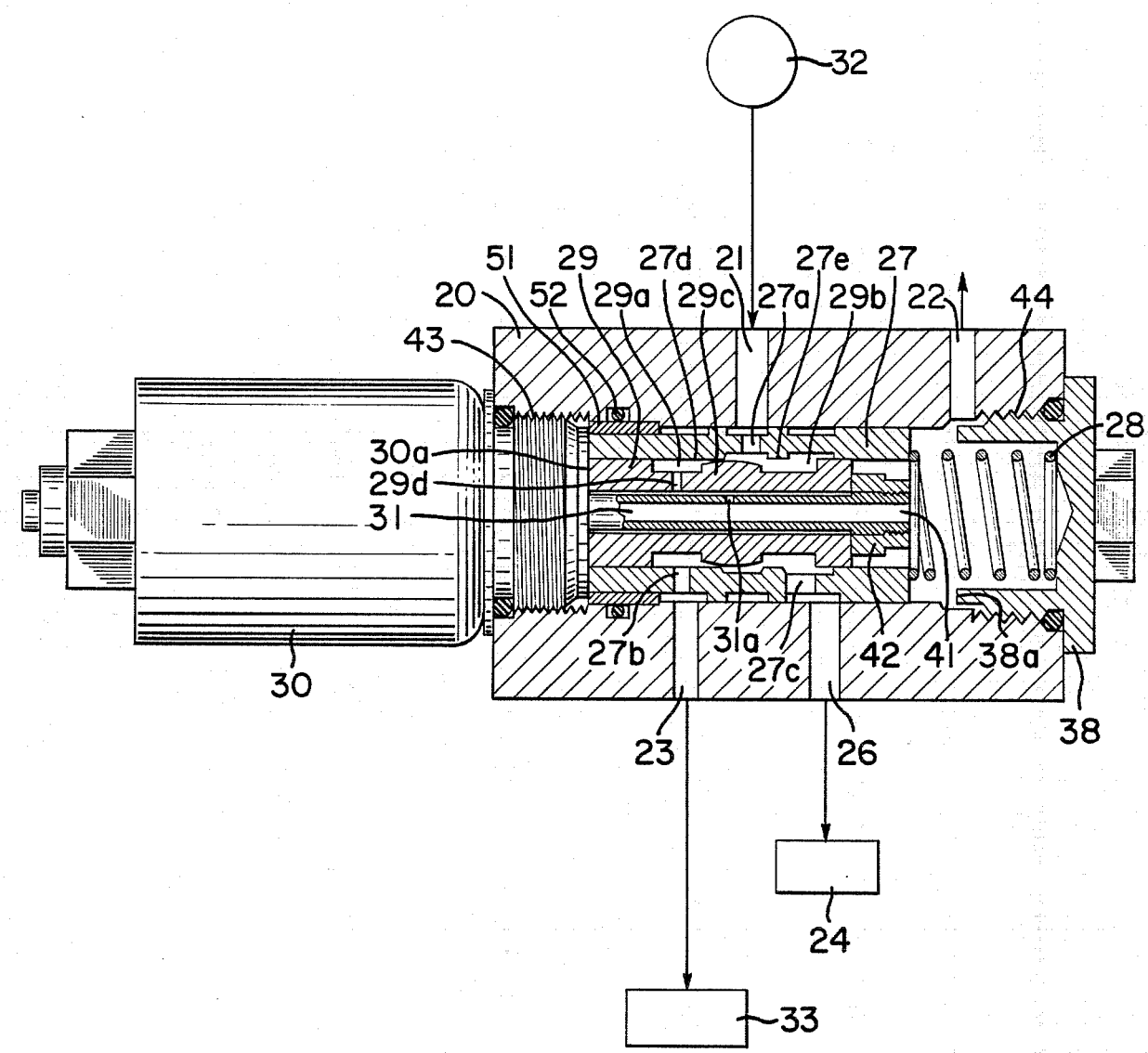
FIGS. 3 to 6 are sections illustrating the control valve of the invention at different conditions, FIG. 3 showing the state when the vehicle is at rest, FIG. 4 when the vehicle is running straightforward at a high speed, FIG. 5 when the vehicle is turning along a curve at a high speed and FIG. 6 when the vehicle is decelerated.
Figure 4:
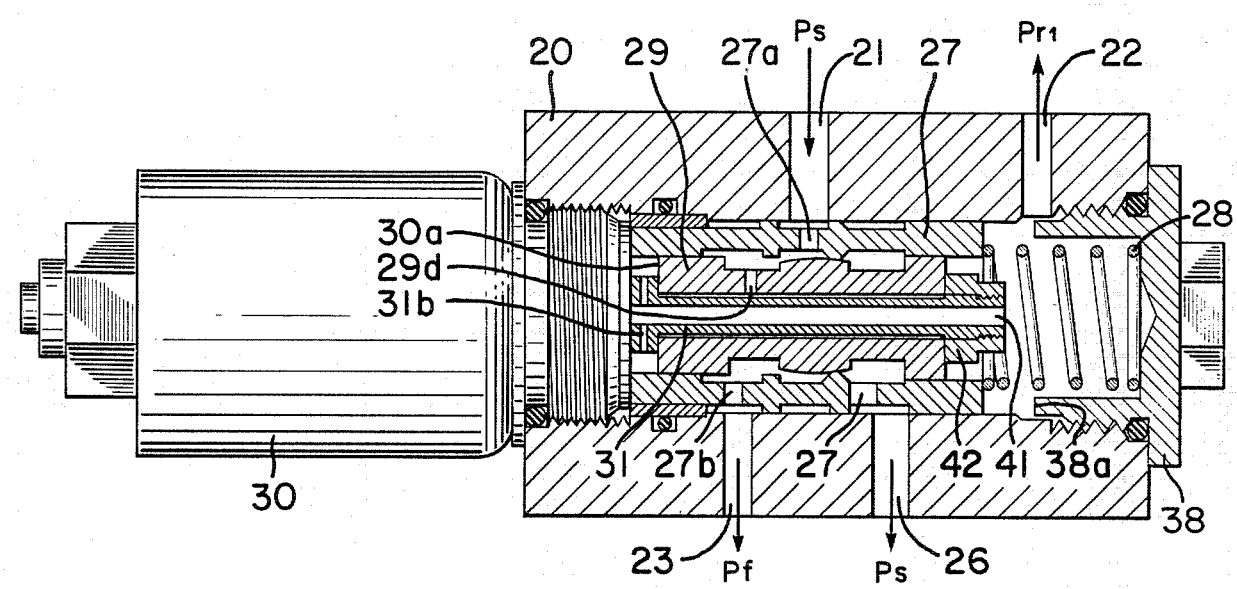

When the vehicle is running straightforward at a high speed, the vehicle speed sensor controls the solenoid 30 to drive the plunger 31 forward as shown in FIG. 4, whereby the variable throttle is closed relative to the main valve 24 while it is opened relative to the reaction chamber 33, allowing the steering pressure Ps to be increased by an amount a shown in FIG. 2 with a corresponding increase in the reaction pressure Pf. As described in U.S. Pat. No. 4,637,487, the reaction piston presses against the projecting shaft of the input shaft, thus improving the rigidity of the steering wheel around the neutral. At this time, the increased reaction pressure Pf is applied to the annular oil path 29a and some amount of the reaction pressure Pf is released to the flow return outlet 22 through the fixed valve 29d, the gap between the sub-spool 29 and plunger 31, the orifice 31a and the axial bore 41. However, the bore diameter of the fixed throttle 29d is dimensioned such that the fixed throttle 29d does not interfere with an increase a in the steering pressure Ps and the reaction pressure Pf.

Figure 5:
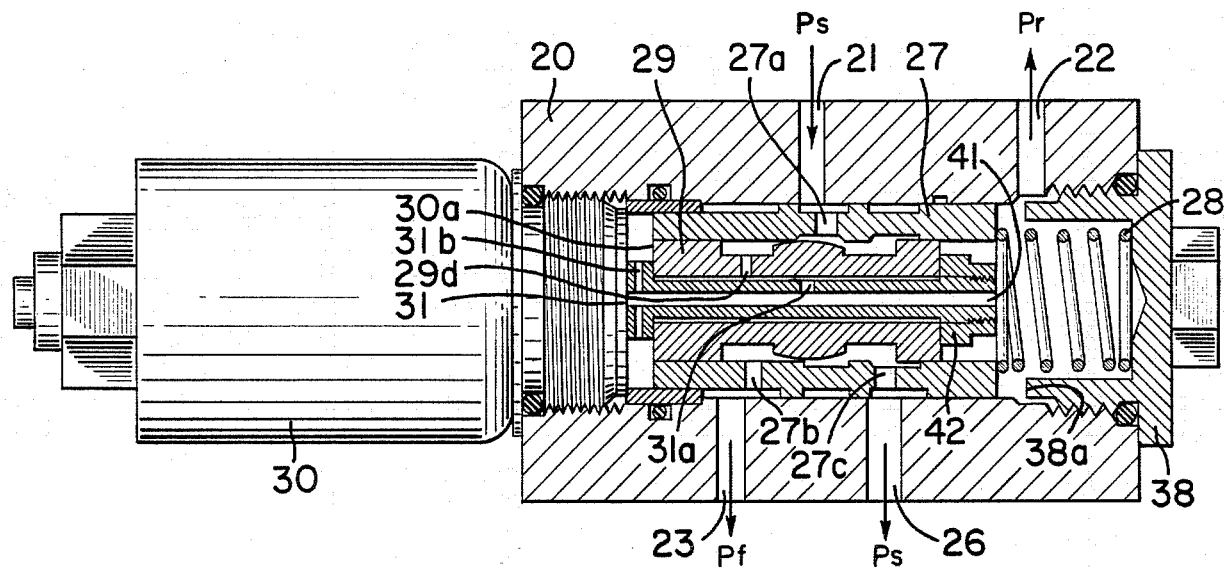

When a steering operation is carried out under a high speed condition, the reaction pressure Pf also increases due to the operation of the reaction piston in the reaction chamber 33. However, when the reaction pressure Pf reaches a value b in FIG. 2, the oil pressure applied to a variable space in the variable throttle causes the main spool 27 to slide forward relative to the sub-spool 29 against the resilience of the spring 28, as shown in FIG. 5, so that the variable throttle is partly closed relative to the reaction chamber and the main spool 27 comes to at stop under the condition where the reaction pressure Pf is balanced with the resilience of the spring 28. At this time, the rear inside of the valve casing 20 separated from the front inside of the valve casing 20 by the main spool 27 communicates with the front inside of the valve casing 20 through the orifice 31b and the axial bore 41 so that there is no pressure difference between the front and rear insides of the valve casing 20 to maintain the main spool 27 in the balanced position. In this manner, the reaction pressure is cut, allowing a steering operation to be effected with a given weight.

The pressure b where the reaction pressure is cut varies with an amount of movement of the sub-spool, and gradually increases with an increase in the vehicle speed.

Figure 6:
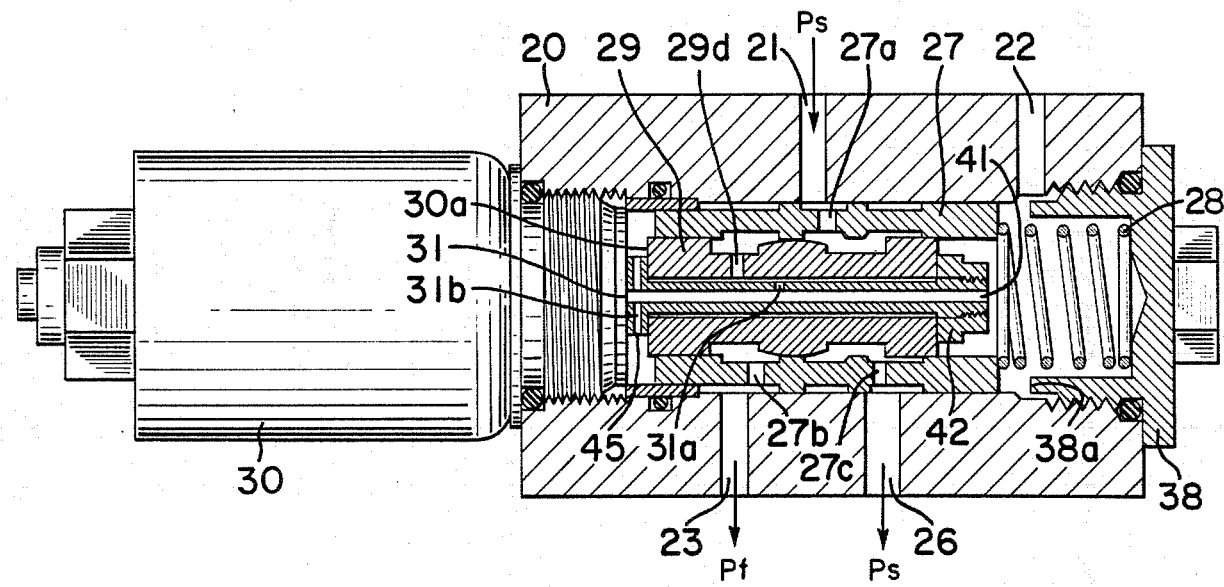

When the vehicle is decelerated under this condition, the vehicle speed sensor operates the solenoid 30 to move the plunger 31 rearward as shown in FIG. 6, and the relative displacement between the valve casing 20, the main spool 27 and the sub-spool 29 increases the length over which the sub-spool is fitted in the main spool toward the reaction chamber, thus reducing the amount of oil leaking from the main circuit to the reaction chamber and rapidly decreasing the reaction pressure Pf. The main spool 27 moves rearward also, thus reducing the steering force. The bore diameter of the fixed throttle 29d is determined so as to avoid a rapid reduction in the reaction pressure Pf which occurs at this time.

To achieve a smooth movement of the main spool, a slight radial clearance is provided between the sleeve 38 and the valve casing 20, thus alleviating any jamming of the main spool which might occur as a result of machining errors.

In accordance with the invention, a sleeve-like main spool, urged by a spring from one side, is slidably disposed within a valve casing which is formed with a flow inlet and a return flow outlet connected to an oil pump, a flow outlet connected to a reaction chamber and a flow outlet connected to a main valve, and a sub-spool which slides axially in accordance with the vehicle speed is fitted inside the main spool so that relative displacement between the main spool and the sub-spool defines a variable throttle having a varying area of opening. When the vehicle is at rest, or at a very slow speed, the variable throttle is opened only relative to the main valve while it is closed relative to the reaction chamber. At a higher speed, the sub-spool is moved in a direction to close the variable throttle relative to the main valve and to open the variable throttle relative to the reaction chamber, thus increasing the reaction pressure. When the reaction pressure reaches a given value in response to the steering pressure, the pressure oil causes displacement of the main spool so as to cut off the reaction pressure. As a result, the rigidity of the steering wheel when running straightforward at a high speed is increased, thus eliminating a lag in the steering response when a rapid steering operation is carried out and enabling the required steering force to be reduced. In this manner, a stabilized oil pressure response is obtained over a prolonged period, while the construction within the valve casing is simplified to allow a machining to a high precision, thereby enabling a compact and inexpensive manufacture.

What is claimed is:

1. An oil pressure control device for use in a power steering apparatus, comprising: a valve casing disposed in an oil pressure path from an oil pump to a main valve and a reaction chamber, the valve casing being formed with a flow inlet and a return flow outlet connected to the oil pump, a first flow outlet connected to the reaction chamber and a second flow outlet connected to the main valve; a sleeve-like main spool slidably disposed within the valve casing and urged by a spring from one side of the valve casing, the main spool having an inner peripheral valve surface; a sub-spool axially slidable in accordance with the vehicle speed and having an outer peripheral valve surface, the sub-spool being fitted inside the main spool so that the inner periheral valve surface of the main spool and the outer peripheral valve surface of the sub-spool define a variable throttle having a varying area of opening for selectively connecting the flow inlet to the main valve and the reaction chamber according to the relative displacement between the main spool and sub-spool; a fixed throttle provided in the sub-spool and communicating between the reaction chamber and the return flow outlet for controlling a reaction pressure in the reaction chamber; first driving means operative when the vehicle speed is below a certain value for moving the sub-spool to cause the variable throttle to connect the flow inlet to the main valve and to disconnect the flow inlet from the reaction chamber and operative when the vehicle speed is above a certain value for moving the sub-spool in a direction to cause the variable throttle to disconnect the flow inlet from the main valve and to cause the variable throttle to connect the flow inlet to the reaction chamber; and second driving means disposed between the inner peripheral valve surface of the main spool and the outer peripheral valve surface of the sub-spool and operative when the reaction pressure reaches a given value in response to a steering pressure for effecting the displacement of the main spool in a direction to cause the variable throttle to disconnect the flow inlet from the reaction chamber thereby cutting the reaction pressure.

2. An oil pressure reaction control device according to claim 1; wherein the first driving means comprises a solenoid having a plunger inserted into the sub-spool and axially movable in response to the vehicle speed.

3. An oil pressure reaction control device according to claim 2; wherein the fixed throttle comprises a first orifice provided in the sub-spool and open at the outer and inner peripheral surfaces of the sub-spool, a gap between the inner peripheral surface of the sub-spool and the outer peripheral surface of the plunger, a bore provided in the plunger and open to a front inside of the valve casing to communicate with the return flow outlet, and a second orifice provided in the plunger and communicating between the gap and bore.

4. An oil pressure reaction control device according to claim 3; wherein the plunger has a third orifice communicating between the bore and a rear inside of the valve casing separated from the front inside of the valve casing by the main spool.

5. A steering force control apparatus for a power steering apparatus of a vehicle of the type having a reaction chamber responsive to fluid pressure applied thereto for producing a reaction force to counteract the steering force produced by a power cylinder, and a fluid pump and a fluid tank for circulating a fluid through the power steering apparatus, the steering force control apparatus comprising: a valve case having an inlet connected to the fluid pump for receiving the fluid pressure produced by the fluid pump, a return outlet connected to the fluid tank for releasing the fluid pressure, a reaction outlet connected to the reaction chamber for applying the fluid pressure thereto, and a main outlet connected to the power cylinder; a main tubular spool disposed in the valve case and movable relative to the valve case, the main tubular spool having a first bore in communication with the inlet, a second bore in communication with the reaction outlet, a third bore in communication with the main outlet, and an inner valve surface extending over the first bore, the second bore and the third bore; a sub-spool disposed in the main spool and movable relative to the main spool and having an outer valve surface cooperative with the inner valve surface; throttling means comprised of the inner valve surface and the outer valve surface for selectively connecting the inlet to the reaction outlet and to the main outlet according to the movement of the sub-spool relative to the main spool; first driving means for moving the sub-spool relative to the main spool in response to a vehicle speed, the first driving means being operative when the vehicle speed is above a certain value to enable the throttling means to connect the inlet and the reaction outlet, and operative when the vehicle speed is below a certain value to enable the throttling means to connect the inlet and the main outlet; a second driving means for moving the main spool relative to the valve case and the sub-spool in response to the fluid pressure applied to the reaction chamber and operative when the fluid pressure exceeds a certain value during the operation of the power steering apparatus to enable the throttling means to disconnect the inlet and the reaction outlet; and communicating means provided in the sub-spool for connecting the reaction outlet to the return outlet through the inside of the valve case for releasing the fluid pressure in the reaction chamber.

6. A steering force control apparatus according to claim 5; wherein the first driving means includes a plunger axially movable and inserted axially into the sub-spool to define a gap between the inner peripheral portion of the sub-spool and the outer peripheral portion of the plunger.

7. A steering force control apparatus according to claim 6; wherein the plunger has a bore extending axially thereof and open to the front inside of the valve case to communicate therethrough with the return outlet, and an orifice communicating between the bore and the gap.

8. A steering force control apparatus according to claim 7; wherein the communicating means comprises an orifice provided in the sub-spool and communicating between the throttling means and the gap.

9. A steering force control apparatus according to claim 7; wherein the plunger has another orifice communicating between the bore and the rear inside of the valve case separated from the front inside of the valve case by the main tubular spool.

10. A steering force control apparatus according to claim 5; wherein the second driving means includes a resilient member provided in the valve case in contact with the main spool for biasing the main spool in a rest position when the fluid pressure is below a predetermined value.

11. A steering force control apparatus according to claim 10; wherein the second driving means includes means defining a variable space provided between the inner valve surface of the main spool and the outer value surface of the sub-spool for moving the main spool against the biasing force in response to the fluid pressure transmitted to the variable space.

* * * * *